United States Patent

Hartman

[15] 3,639,189

[45] Feb. 1, 1972

[54] ADHESIVE COMPOSITIONS COMPRISING POLYETHYLENE AND OXIDIZED POLYETHYLENE

[72] Inventor: Paul F. Hartman, Wayne, N.J.

[73] Assignee: Allied Chemical Corporation, New York, N.Y.

[22] Filed: Sept. 9, 1969

[21] Appl. No.: 856,494

[52] U.S. Cl. .................. 156/244, 117/132 C, 117/148 CX, 117/161 ZA, 117/161 UF, 117/161 UZ, 156/306, 156/334, 161/206, 161/216, 260/889, 260/897 B, 260/897 A

[51] Int. Cl. .................................................. C08f 29/12

[58] Field of Search ............ 260/897, 94.9 G, 889; 161/206, 161/207, DIG. 4; 156/329, 244; 117/135.1

[56] References Cited

UNITED STATES PATENTS

| | | | |
|---|---|---|---|
| 3,445,326 | 5/1969 | Hurst | 161/207 |
| 3,367,999 | 2/1968 | Steierman | 260/897 |
| 3,256,365 | 6/1966 | Wolinski | 260/897 |
| 3,222,431 | 12/1965 | Greear et al. | 260/897 |

*Primary Examiner*—Murray Tillman
*Assistant Examiner*—C. Seccuro
*Attorney*—Patrick L. Henry and Birgit E. Morris

[57] ABSTRACT

Compositions of a polyethylene melt blended with from 1 to 15 percent of an oxidized linear polyethylene having a melt index of 10 to 3,500, molecular weight of from 6,500 to 20,000 and a crystalline melting point of from 125°–130°C. These blends have excellent adhesion to various substrates, particularly to metals and can be applied directly as an adhesive protective coating from the melt. The blends may additionally contain an elastomer.

13 Claims, No Drawings

ADHESIVE COMPOSITIONS COMPRISING POLYETHYLENE AND OXIDIZED POLYETHYLENE

BACKGROUND OF THE INVENTION

Polyethylene is widely used as a coating for a variety of materials and as films for packaging due to its low cost, inertness, toughness and flexibility. However, by virtue of its inertness, difficulties are encountered in achieving good adhesion of the polyethylene to a substrate, particularly to metal substrates. Polyethylene generally cannot be bonded directly to a metal substrate, and either an adhesive must be applied to the surface of the substrate, or the metallic surface etched, as with strong acids. These additional steps add materially to the cost of utilizing polyethylene as a coating. Paints and inks do not adhere well to polyethylene surfaces, which must be pretreated, as by printability treatments, or by oxidizing the surface to prevent inks and paints from rubbing off the surface during handling. These disadvantages have limited the use of polyethylene in coating and packaging applications until now.

Oxidized polyethylenes are known to have improved adhesion over polyethylene, but unfortunately, oxidized polyethylene has inferior physical properties and is a brittle material unsuitable as a coating or packaging material.

DESCRIPTION OF THE PRIOR ART

Blends of polyethylene and certain oxidized low molecular weight polyethylene waxes are known which have improved ink receptivity and printability. For example, U.S. Pat. Nos. 3,061,882 to Wolinski, issued Nov. 6, 1962 and 3,222,431 to Geear et al. issued Dec. 7, 1965 disclose blends of polyethylene with oxidized polyethylene of about 1,000 to about 6,000 weight average molecular weight. However, these blends impart only limited adhesion to metal substrates.

SUMMARY OF THE INVENTION

It is an object of the present invention to provide an adhesive polyethylene composition which has excellent physical properties and which will adhere directly to metallic substrates.

It is another object to provide a process for coating a metal substrate in a simple melt extrusion process without the need of applying a separate adhesive formulation to the substrate.

Further objects will become apparent from the following detailed description thereof.

It has been found that a composition of polyethylene melt blended with from 1 to 15 percent, preferably 1 to 10 percent, by weight of an oxidized linear polyethylene having up to about 5 percent by weight of oxygen, melt index of from 10 to 3,500, molecular weight of from 6,500 to 20,000, a crystalline melting point of from about 125° to 130° C., and a melt viscosity at 140° C. of from 7,000 to 1,000,000 centipoises has improved adhesive properties over known blends of polyethylene and low molecular weight oxidized polyethylene. The compositions of the invention can be adhered directly to metal substrates by simply hot pressing, e.g., contacting the polyethylene-oxidized polyethylene blend to the clean substrate at temperatures of from about 300°–325° F. for a short time so as to ensure uniform contact of the blend and the substrate and cooling. The compositions of the invention have excellent physical properties and surprisingly good adhesion to a variety of substrates, particularly metals, and have improved printability.

In another aspect of the invention, water resistance of the polyethylene-oxidized polyethylene blend bond to metals is improved by the addition of about 10 to 20 percent by weight of the blend of conventional elastomers such as polyisobutylene, butyl rubber, high molecular weight ethylene-propylene copolymers or terpolymer rubbers and the like. The addition of at least 0.1 percent of an oxysilane, along with the elastomer further improves water resistance of the bond.

DETAILED DESCRIPTION OF THE INVENTION

The oxidized polyethylenes useful in the present invention are highly crystalline polymers which have melt index, molecular weight and crystalline melting points as described hereinabove. In addition they have densities of from 0.990 to 0.995, Ring and Ball softening points of from about 146°–147° C., and crystallinity of 90 percent or higher as determined by X-ray analysis. These polymers have a carboxyl group content of from 0.025 to 0.75 meq./g., total carboxyl of from 0.07 to 1.10 meq./g., hydroxy content of from 0.035 to 0.18 meq./g. and ester content of from 0.015 to 0.30 meq./g.

The oxidized polyethylenes are prepared by oxidation of a linear polymer of ethylene having a reduced specific viscosity of 1.0 to 30 deciliters/g. in the solid state in an atmosphere of molecular oxygen at a temperature of from 90° C. up to the crystalline melting point of the polyethylene until the desired oxygenation is reached. The process is described in greater detail in U.S. Pat. No. 3,322,711 to Bush et al. which issued May 30, 1967.

The oxidized polyethylene as described hereinabove can be blended with any molding-grade polymer of ethylene whether linear or branched, high density or low density, produced by Phillips catalyst, Ziegler catalyst and the like. The polyethylene can contain other ingredients, such as heat and light stabilizers, pigments and the like as well as conventional fillers such as silica, sand, carbon black and glass beads or glass fibers, and the like.

The above-described oxidized polyethylene and a polyethylene are melt blended in an amount of from 1 to 15 percent, preferably 1 to 10 percent of oxidized polyethylene by weight of the blend. Excellent adhesion is obtained even at low loadings of the oxidized polyethylene, but generally an increase in adhesion is obtained at higher concentrations. However, compositions containing above about 15 percent of oxidized polyethylene become increasingly brittle.

The blend can be formed into sheets or film for packaging and can be applied to the substrate and pressed onto the substrate at melt temperatures. When forming laminates, particularly laminates with metals, the metals are generally preheated to melt temperatures to minimize deformations and stresses caused by uneven cooling of the polymer and the metal. Preferably, the oxidized polyethylene and polyethylene are melt blended in an extruder and extruded directly onto the substrate from the melt. Temperatures of from 300°–325° F. are required for adhesion, and the melt should be applied with a light pressure sufficient to ensure uniform contact of the blend with the substrate.

The adhesive compositions of the invention can be bonded to a variety of substrates, including metals, glass, plastics, wood, paper and the like and are particularly valuable as coatings for steel, copper and aluminum. Inks and paints adhere well to films and sheets of the blends which do not require further treatment prior to printing for most applications.

The excellent adhesion of the present blends to a substrate was highly surprising and unexpected, since the oxidized polyethylenes as described hereinbefore do not impart adhesive properties to other polymers of α-olefins such as polypropylene. Addition to polyethylene of other polymers which have carboxyl groups present, such as Surlyn A, a polymer manufactured by E. I. duPont deNemours and Co., which is a polymer having a hydrocarbon backbone with pendant ionized carboxyl groups, does not confer appreciable adhesion to metals of the polyethylene.

The water resistance of bonds between metals and the blends of the invention can be improved by adding conventional elastomers, such as butyl rubber or polyisobutylene in an amount of from about 5 to 25 percent by weight of the polyethylene. The addition of such minor amounts of an elastomer also helps to reduce distortions and strains formed by uneven cooling of polyethylene-metal laminates, although it somewhat reduces the adhesion of the polyethylene-oxidized polyethylene blends of the invention to a metal substrate.

The addition of a small amount of from 0.1 to 1 percent of an alkoxysilane to the blends of the invention containing an elastomer is also helpful in improving water resistance. Suitable alkoxysilane compounds are well known and include for example N-β-aminoethyl-2-aminopropyltrimethoxysilane, 3-(N-ethylamino)aminopropyltrimethoxysilane, aminopentylmethyldimethoxysilane, phenylaminopropyltrimethoxysilane, β-aminoethyltrimethoxysilane, 3-aminopropyltriethoxysilane, mercaptopropyltrimethoxysilane and the like.

The invention will be further illustrated by the following examples but it is to be understood that the invention is not meant to be limited to the details described therein.

In the examples, all parts and percentages are by weight unless otherwise noted. Peel strength was determined according to ASTM test D 1876 and results are given in pounds per inch width during 90° or 180° peel at a head speed of 2 in./min. Shear bond strength was determined according to ASTM test D 1002–53T.

EXAMPLE 1

A linear polyethylene prepared according to U.S. Pat. No. 2,825,721 having a density of 0.950, a melt index of 0.4, ultimate tensile strength of 2,200 and 450 percent elongation was charged to a Plastograph and various amounts of an oxidized polyethylene having a melt index of 420, molecular weight of 8,500, specific reduced viscosity of 0.45, density of 0.990, crystalline melting point of 128°–130° C., Ring and Ball softening point of 146° C., containing 3.48 percent of total oxygen, 0.48 meq./g. of carboxyl groups, 0.68 meq./g. of total carbonyl groups, 0.19 meq./g. of ester groups and 0.12 meq./g. of hydroxyl groups and having a tensile strength of 2,300 p.s.i., elongation of 1.8 percent, tensile modulus of 298,000 and Shore D hardness of 63 were melt blended. 10–20-mil plaques were pressed from the blends and the plaques melted at 300°–325° F. and pressed to cold-rolled steel plates which were sandblasted and rinsed with toluene in a compression mold at minimum pressures.

Peel strength data are given below:

| Amount of oxidized polyethylene in the blend | Peel, lb./in. 90° | 180° |
|---|---|---|
| Control | None | None |
| 5% | 40 | 60 |
| 10% | 45 | 55 |

Shear bond strength of the blend prepared as above containing 10 percent of the oxidized polyethylene was 1,300 p.s.i. using a 1-in. overlap.

A blend containing 10 percent of the oxidized polyethylene pressed to a copper strip had a shear bond strength of 1,400 p.s.i. using a 1-in. overlap.

EXAMPLE 2

A blend containing 5 percent of the oxidized polyethylene described in example 1 was prepared with a low-density branched polyethylene having a density of 0.923 and melt index of 2.3. This product had a shear bond strength to steel plates of 1,250 p.s.i. at 1-in. overlap, and a peel strength of more than 35 lb./in. at 90° peel.

EXAMPLE 3

The procedure of example 1 was followed except that the oxidized polyethylene had a melt index of 1,900, molecular weight of 7,800, reduced specific viscosity of 0.32, density of 0.991, crystalline melting point of 128°–129° C., Ring and Ball softening point of 147° C., total oxygen content of 3.06 percent, carboxyl group content of 0.48 meq./g. total carbonyl group content of 0.71 meq./g., ester group content of 0.14 meq./g., hydroxyl group content of 0.10 meq./g., a tensile strength of 2,000 p.s.i., tensile modulus of 276,000, elongation of 1.2 percent and Shore D hardness of 56. The blend had excellent physical properties; tensile strength at yield of 2,027 p.s.i., tensile strength of 2,341 p.s.i. and elongation of 67 percent.

The shear bond strength to steel plates of a blend containing 5 percent of the oxidized polyethylene was 1,586 p.s.i. at ½-in. overlap and of a blend containing 10 percent of the oxidized polyethylene was 1,675 p.s.i. at ½-in. overlap. The shear bond strength of the same blend to aluminum plates cleaned by rinsing in xylene and acetone was 625 p.s.i. using a ½-in. overlap. Peel strength of this bond was 5 lb./in. at 180°.

EXAMPLE 4

An oxidized polyethylene having a melt index of 10, molecular weight of about 20,000, melt viscosity at 140° C. of about 1,000,000, reduced specific viscosity of 0.9, crystalline melting point of 129° C., and containing 1.1 percent of carbonyl groups; was melt blended in various proportions with the polyethylene of example 1 and applied to steel plates. Excellent adhesion was obtained even at very low concentrations of the oxidized polyethylene. The results are summarized below:

| % Oxidized Polyethylene in the Blend | Shear, psi 1/2" overlap | Peel, lbs./in 90° | 180" |
|---|---|---|---|
| 1.25 | 1,285 | 16–17 | 20 |
| 2.5 | 1,370 | 20 | 25 |
| 5 | 1,327 | 25 | 33 |
| 10 | 1,452 | 35 | 40–45 |
| 20 | — | 35 | 40 |

A blend of a polyethylene having a density of 0.960 and a melt index of 0.7 containing 5 percent of the oxidized polyethylene described above had excellent adhesion to a steel plate, as shown by a shear bond strength of 1,515 p.s.i. at ½-in. overlap.

EXAMPLE 5

An oxidized polyethylene having a melt index of 78, crystalline melting point of 130° C., and molecular weight of about 10,000 was melt blended with the polyethylene of example 1 and applied to steel plates. Excellent adhesion was obtained even at very low loadings of the oxidized polyethylene, as seen from the data given below:

| % oxidized polyethylene in the blend | Peel, lb./in. 90° | 180° |
|---|---|---|
| 1.25 | 25 | 30 |
| 5 | 26 | 30 |

EXAMPLE 6

The procedure of example 1 was followed to prepare blends containing 5 percent of the oxidized polyethylene described in example 3 and various amounts of a butyl rubber (available as Enjay Butyl 268 from Enjay Chemical Co.).

Test results are summarized below:

| Amount of butyl rubber | Substrate | Shear bond strength, p.s.i., ½" overlap | Peel strength (lbs./in.) at 90° | 180° |
|---|---|---|---|---|
| 10 | Steel | | 27 | 40 |
| 20 | do | 1,400 | 27 | 34 |
| 20 | Aluminum | 1,080 | | 48 |

The bond to steel of the above blend was somewhat water resistant, resisting peeling for 72 hours in water at room temperature and about 4 hours in boiling water. In comparison, a blend of the above-described polyethylene and 5 percent of the oxidized polyethylene but without the butyl rubber resisted peeling for only 48 hours at room temperature and one-fourth hour in boiling water.

Shear bond strength data for boiling water is given below:

| Temperature of Compression molding | Time, hours | | | | |
|---|---|---|---|---|---|
| | 0 | 1 | 2 | 7 | 24 |
| 300° F. | 1,220 | 550 | 500 | 720 | 530 |
| 325° F. | 1,120 | — | 616 | — | 900 |

The butyl rubber alone does not impart any appreciable adhesion to polyethylene. A blend of the polyethylene as described above containing 25 percent of the butyl rubber, but omitting the oxidized polyethylene, had a peel strength of only 2 and 4 lb./in. at 90° and 180° respectively.

EXAMPLE 7

The bond to steel of a blend of the polyethylene described in example 1 containing 5 percent of the oxidized polyethylene of example 3 and 20 percent of a polyisobutylene rubber (available as "Vistanex" registered Trademark of Enjay Chemical Co.) had improved water resistance over a control omitting the polyisobutylene elastomer. Results are summarized below:

| Composition | Water resistance | |
|---|---|---|
| | Room temperature | boiling water |
| Blend of example 7 | 72 | 6 |
| Control | 48 | ¼ |

EXAMPLE 8

This example demonstrates that resistance to water of the blends of the invention is further improved by the addition of small amounts of an alkoxysilane compound. A blend of the polyethylene of example 1 containing 5 percent of the oxidized polyethylene of example 3, 20 percent of the butyl rubber of example 6 and example percent of phenylaminopropyltrimethoxysilane (available as Dow-Corning XZ-8-0990 from Dow-Corning Corporation) was prepared and plaques pressed onto steel plates. Shear bond strength results for boiling water are given below:

| Temperature of Compression molding | Time, hours | | | | | |
|---|---|---|---|---|---|---|
| | 0 | 1 | 2 | 7 | 24 | 48 |
| 300° F. | 1,210 | 1,200 | 1,010 | 940 | 1,040 | — |
| 325° F. | 1,280 | — | — | — | 1,080 | 1,100 |

The blend described above was applied to uncleaned aluminum foil. The bond did not fail after immersion of the coated foil in hot (80°–90° C.) water after 1 week.

EXAMPLE 9

The procedure of example 8 was followed substituting a different alkoxysilane, aminopentylmethyldimethoxysilane (available as Dow Corning XZ-2-2023). Test results are given below:

| Temperature of Compression molding | Time, hours | | | | | |
|---|---|---|---|---|---|---|
| | 0 | 1 | 2 | 7 | 24 | 40 |
| 300° F. | 1,235 | 960 | 840 | 1,080 | 1,350 | — |
| 325° F. | 1,140 | — | — | — | 1,220 | 1,300 |

EXAMPLE 10

The adherence of the blend of example 3 containing 5 percent of the oxidized polyethylene to various nonmetallic substrates was tested by coating two steel strips, one with the blend of the invention as described and the other with a coating of the substrate to be tested. The two coated strips were pressed together at 300° F. for 5 minutes.

Results are given below:

| Substrate | Peel, lb./in. | Shear p.s.i. ½" overlap |
|---|---|---|
| Polyvinylbutyral[1] | — | 900 |
| Epoxy cement[2] | 18 | 850 |
| Epoxy-based paint[2] | 15–20 | — |
| Polyvinylbutyral-based paint[3] | 11.5 | — |

[1] Butval B90, registered trademark of Shawnigan Products Corp., melt pressed to the steel strip from a film.

[2] Applied to the steel strip with a brush.

[3] A wash primer, Beta Cote No. 75–14 of Essex Chemical Corporation, BFC division, applied to the steel strip with a brush.

Plaques were molded of the composition described above and the paints were applied to the plaques with a brush, allowed to dry, the surface scratched with a knife edge and adhesive cellophane tape pressed firmly onto the prepared surfaces. The tape was pulled up rapidly. The paints adhered well to the surface of the plaques. In contrast, the tape removed all of the paints applied to control plaques molded from the polyethylene alone.

EXAMPLE 11

For comparison with the compositions of the invention a polyethylene-low molecular weight oxidized polyethylene wax blend was prepared for adhesion to a steel plate. A blend was prepared from the polyethylene as in example 1 containing 10 percent of an oxidized polyethylene wax having a melt index of over 10,000, molecular weight of 1,900, crystalline melting point of 92°–94° C., Ring and Ball softening point of 102° C., total oxygen content of 3.61, carboxyl group content of 0.31 meq./g., total carbonyl group content of 0.77 meq./g., ester group content of 0.19 meq./g., hydroxyl group content of 0.52 meq./g., tensile strength of 510 p.s.i., tensile modulus of 47,000 and Shore D hardness of 24.

When applied to a steel plate as in example 1, the peel strength was only 4–5 lb./in. at 180° peel.

We claim:

1. An adhesive composition comprising a melt blend of a polyethylene with 1 to 15 percent by weight of an oxidized linear polyethylene having up to 5 percent of oxygen, melt index of from 10 to 3,500, molecular weight of from 6,500 to 20,000 and a crystalline melting point of from about 125° to about 130° C. and from 10 to 20 percent by weight of the polyethylene of an elastomer selected from the group consisting of polyisobutylene, butyl rubber and high molecular weight ethylene-propylene copolymer or terpolymer rubbers.

2. A composition according to claim 1 containing from 1 to 10 percent by weight of the oxidized polyethylene.

3. A composition according to claim 1 additionally containing from 0.1 to 1.0 percent by weight of the polyethylene of an alkoxysilane.

4. An article comprising a metal substrate and an adherent coating of a composition of a polyethylene with 1 to 15 percent by weight of an oxidized linear polyethylene having up to 5 percent of oxygen, melt index of from 10 to 3,500, molecular weight of from 6,500 to 20,000 and a crystalline melting point of from about 125° to about 130° C. and from 10 to 20 percent by weight of the polyethylene of an elastomer selected from the group consisting of polyisobutylene, butyl rubber and high molecular weight ethylene-propylene copolymer or terpolymer rubbers.

5. An article according to claim 4 wherein the metal substrate is selected from the group consisting of steel, copper and aluminum.

6. An article according to claim 4 wherein the metal substrate is aluminum foil.

7. An article according to claim 1 wherein the composition additionally contains from 0.1 to 1.0 percent by weight of an alkoxysilane.

8. A method of coating a metal substrate comprising melt blending a polyethylene with an oxidized linear polyethylene having up to 5 percent of oxygen, a melt index of from 10 to 3,500, molecular weight of from 6,500 to 20,000 and a crystalline melting point of from about 125° to about 130° C. and an elastomer selected from the group consisting of polyisobutylene, butyl rubber and high molecular weight ethylene-propylene copolymer or terpolymer rubbers, to form a composition containing from 1 to 15 percent of the oxidized polyethylene, and from 10 to 20 percent of the elastomer and hot-pressing the composition to the substrate.

9. A method according to claim 8 wherein the composition contains from 1 to 10 percent by weight of the oxidized polyethylene.

10. A method according to claim 8 wherein the composition additionally contains from 0.1 to 1.0 percent by weight of an alkoxysilane.

11. A method of coating a metal substrate comprising melt blending a polyethylene with an oxidized linear polyethylene having up to 5 percent of oxygen, a melt index of from 10 to 3,500, molecular weight of from 6,500 to 20,000 and a crystalline melting point of from about 125° to about 130° C. and an elastomer selected from the group consisting of polyisobutylene, butyl rubber and high molecular weight ethylene-propylene copolymer or terpolymer rubbers, to form a composition containing from 1 to 15 percent of the oxidized polyethylene, and from 10 to 20 percent of the elastomer, extruding the composition directly onto the substrate in the form of a sheet or film and cooling to solidify the polyethylene blend.

12. A method according to claim 11 wherein the composition contains from 1 to 10 percent by weight of the oxidized polyethylene.

13. A method according to claim 11 wherein the composition additionally contains from 0.1 to 1.0 percent by weight of an oxysilane.

* * * * *